United States Patent Office 3,443,424
Patented May 13, 1969

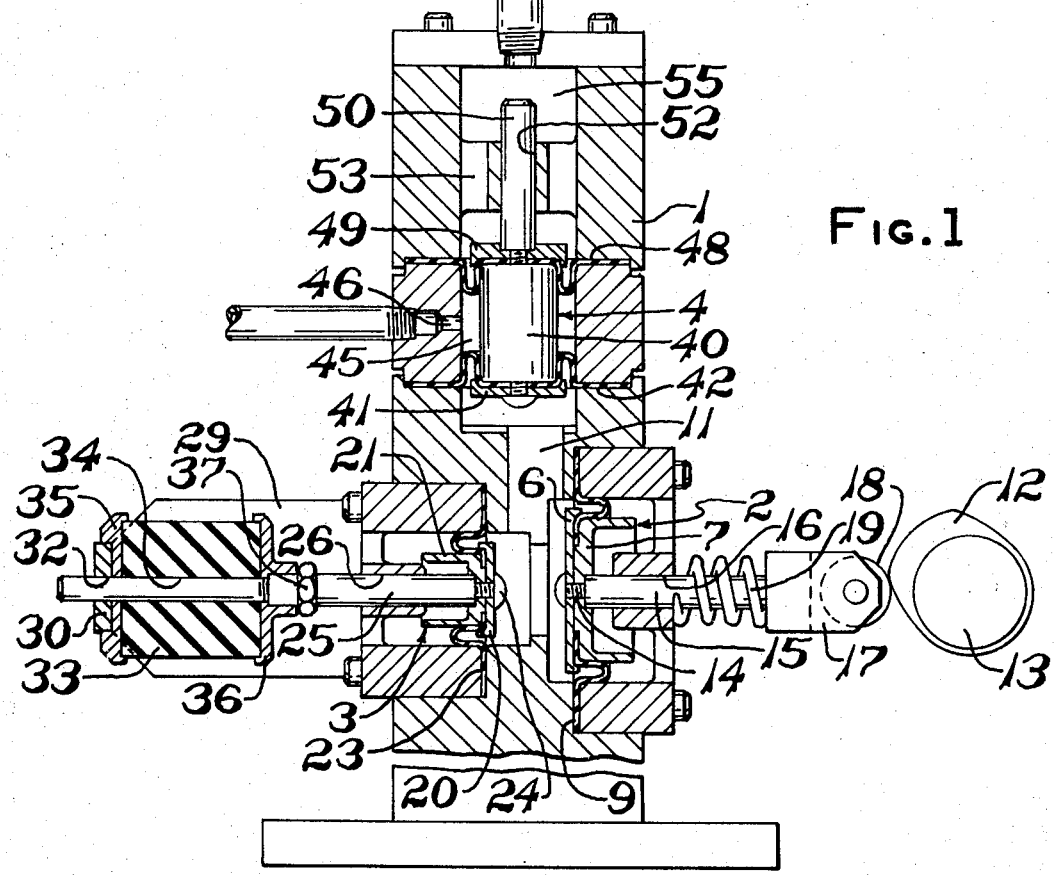

3,443,424
FATIGUE TESTING APPARATUS
Alfonso W. Mehrbrodt, Broadview Heights, and Nicholas M. Trivisonno, Mayfield Heights, Ohio, assignors to The B. F. Goodrich Company, New York, N.Y., a corporation of New York
Filed Jan. 16, 1967, Ser. No. 609,550
Int. Cl. G01n 3/32
U.S. Cl. 73—92                    7 Claims

ABSTRACT OF THE DISCLOSURE

An apparatus for testing elastomeric specimens of material by operating a cyclic drive input piston on a constant volume hydraulic chamber which in turn transfers a preselected cyclic constant stress force onto a test specimen with the apparatus compensating for changes in characteristics within the specimen.

Background of the invention

This invention relates to a testing apparatus and more particularly to an apparatus for fatigue testing of elastomeric material.

Heretofore, the machines for testing elastomeric material such as tire tread material for wear capabilities were limited in application due to changing characteristics in the materials and due to the difficulty in measuring such values in view of the materials taking a set, weakening or otherwise tending toward failure. Realizing such limitations, the application of testing machines have tended toward the employment of complex control circuits in cooperation with means to adjust for variations in characteristics which have complicated the testing procedure.

Summary of the invention

The present invention provides a simple novel coordinated set of component elements which define a machine that subjects the test material, such as tread stock, to conditions similar to that under a natural road test while accelerating such testing with automatic take-up for change in characteristic of the test specimen.

The present invention uses an input piston which transfers a constant cyclic force through a constant volume hydraulic chamber to an output piston and a balance piston whose displacements are equal to the input piston to provide a constant stress deformation cycle on a tire tread specimen automatically compensating for changes of characteristics within the specimen. This invention provides a new and improved fatigue testing apparatus. This invention provides a new and improved fatigue testing machine which automatically compensates for changing characteristics within the specimen while maintaining an uninterrupted constant stress cycling force operating on the specimen. The invention provides an improved fatigue testing machine which has a fixed cycling force applied to a test specimen with means for taking up changes which occur within the test specimen. This invention provides a new and improved fatigue testing machine which is simple in construction having a high degree of accuracy, and flexibility of operation and control.

These and other objects of the invention will become more apparent upon the following detailed description of a preferred embodiment thereof when taken in conjunction with the drawings.

Brief description of the drawings

FIG. 1 is a side elevational cross sectional view of the fatigue testing machine with parts broken away.

FIG. 2 is a fragmentary plan view of the test specimen and the support means thereof.

FIG. 3 is a circuit diagram of a conventional resistance bridge measuring circuit used with the present invention.

Description of the preferred embodiment

Referring to FIG. 1, there is shown a fatigue testing apparatus which applies a predetermined constant force at a given cyclic rate to a test specimen comprising a sectionalized casing 1 housing an input piston 2, an output piston 3 and a balance piston 4.

Input piston 2 comprises a follower disc 6 and a cup-shaped disc 7 which clamp between their outer edges the inner peripheral edge of an annular diaphragm 9. The outer peripheral edge of diaphragm 9 is clamped between portions of the sectionalized casing 1. Diaphragm 9 is subject on one side to the hydraulic pressure in a chamber 11 and on the other side to the action of a cam 12 mounted on a shaft 13 rotated by suitable drive means not shown. Discs 6 and 7 are secured together by a screw 14 threaded into one end of a rod 15, which rod 15 is guided in its reciprocal movement in a bore 16 of sectionalized casing 1. Secured to the other end portion of rod 15 is a bifurcated block 17 which journals a roller 18 which abuttingly engages the cam 12. Roller 18 is biased into engagement with cam 12 by a compression spring 19 housed on rod 15 and located between sectionalized casing 1 and the block 17.

Output piston 3 comprises a follower disc 20 and a cup-shaped disc 21 which clamp between their outer edges the inner peripheral edge of a diaphragm 23. The outer peripheral edge of the diaphragm 23 is suitably clamped between portions of the sectionalized portion 1. Diaphragm 23 is subject on one side to the hydraulic pressure in chamber 11. The discs 20 and 21 are secured together via a screw 24 which is threaded into one end of a rod 25 which is guided in its reciprocal movement by a bore 26 in the sectionalized casing 1. Sectionalized casing 1 has a pair of outwardly extending brackets 28 and 29 (FIG. 2) extending outwardly relative to the output piston 3, which brackets 28 and 29 receive at their outermost end portion a cross brace 30 suitably secured thereto. Cross brace 30 has a bore 32 located in its intermediate portion to guide the outermost end portion of rod 25. A cylindrical test specimen 33 having a bore 34 extending longitudinally therethrough is suitably clamped between a pair of annular brackets 35 and 36, which sample and brackets are mounted on the outermost end portion of rod 25 such that the annular bracket 35 is in engagement with the cross brace 30 while the annular bracket 36 is secured to the intermediate threaded portion of the rod 25 as by a nut 37. As viewed in FIG. 1, movement of the rod 25 in a leftward direction moves the annular bracket 36 along therewith compressing the test specimen 33 while annular bracket 35 remains stationary on the cross brace 30. Movement of the rod 25 in a rightward direction releases such pressure and returns the annular bracket 36 to its initial starting position in a manner to be more fully described hereinafter.

The balance piston 4 comprises a cylindrical rod 40 and an annular disc 41 in cooperative relationship to clamp therebetween the inner peripheral edge of a diaphragm 42. The outer peripheral edge of the diaphragm 42 is suitably clamped between portions of the sectionalized casing 1. Diaphragm 42 is subject on one side to the hydraulic pressure in chamber 11 while the other side of diaphragm 42 is subject to atmospheric pressure in chamber 45, which chamber 45 is vented to atmosphere via a bore 46. Balance piston 4 additionally has its cylindrical rod 40 suitably clamping the inner periphery of an annular diaphragm 48 in cooperation with an annular disc 49 which are secured together by a longitudinally extending guide rod 50 which is suitably threaded into the cylindrical rod 40. Rod 50 is guided in its vertical reciprocal movement in the sectionalized casing 1 by a bore 52 in spider 53. Diaphragm 48 is subject on one side to atmospheric pressure from chamber 45 while the other side is subject to pneumatic pressure in a chamber 55 which is connected by a conduit 56 to an enlarged reservoir or tank 57. Although tank 57 is shown as small in comparison with the sectionalized casing 1, such designation is diagrammatic and the relative size of tank 57 is considerably larger than the sectionalized casing 1 such that any movement of the balance piston 4 upwardly has an insignificant change on the volume in tank 57 relative to the volume in chamber 11. A gauge G is connected to tank 57 to indicate the pressure therein. With the area of balance piston 41 equal to the area of output piston 3, the pressures thereon would be the same. A thermocouple is put into the test sample 33 to measure the temperature, temperature rise and energy input. A strain gauge if desired may be located on the annular bracket 35 to indicate the stress exerted thereon and thereby directly indicating the pressure applied to the sample. Such strain gauges are common and well known in the art and a detailed description is not seen necessary; see U.S. Patents 2,350,722 and 3,196,671.

In FIG. 3 a conventional resistance bridge measuring circuit having resistances A–D is powered by power source E. One of the legs of the resistance bridge includes a strain gauge as mentioned above which senses the strain in the test specimen. Indicator 58 gives a reading of this strain.

In the operation of the apparatus, cam 12 is driven at a constant speed whereby the raised portion thereof compresses the spring 19 and exerts a cyclic constant force on the input piston 2, which operates on the chamber 11. Such displacement is taken up by the output piston 3 which exerts a constant force on the test specimen 33 with the balance of the displacement being taken up by the balance piston 4 such that the displacement of the output piston 3 and the balance piston 4 is equal to the displacement of the output piston 2 thereby maintaining a constant volume in chamber 11. Since the input piston is driven through a fixed displacement it provides a constant predetermined force on the output piston 3 which is moved a predetermined amount as determined by the modulus of elasticity of the test sample and with the remaining displacement being taken up by the balance piston 4 as indicated above. Any change in displacement or dimension of the test sample would not effect the test as the balance piston 4 would take up the difference in displacement and the force on the sample would be the same. During such leftward movement of the input piston 2, the output piston 3 is moved in a leftward direction compressing the test sample 33 between the annular bracket 35 and the annular bracket 36. Simultaneously with such action the balance piston 4 is moved in an upward direction sufficiently to maintain a constant volume in chamber 11. The chamber 45 being vented to atmosphere does not oppose the movement of such piston but facilitates the movement of the balance piston 4. However, the end portion of rod 50 which is connected to the balance piston 4 as well as disc 49 compresses the volume above such balance piston 4, which volume affects the pressure in tank 57. However, such volume change is insignificant since its volume is also measured by the relatively large volume contained in pneumatic tank 57. Gauge G designates the pressure developed in such tank due to the compression or movement of balance piston 41, which pressure is the same as the pressure exerted upon the output piston 3. After repeated cycling of the cam 12, the change in temperature within the sample is registered by the thermocouple and, if desired, the strain gauge may be utilized to measure the force thereon. Gauge G on the tank operates to measure fatigue and the force exerted upon the test specimen.

Various modifications are contemplated and may obviously be resorted to by those skilled in the art without departing from the spirit and scope of the invention, as only a preferred embodiment thereof has been disclosed.

We claim:

1. A fatigue testing machine for testing tread material comprising a housing having a recessed portion, an input piston and an output piston cooperative with said recess to define a closed hydraulic chamber, drive means operatively connected to said input piston for exerting a cyclic force thereon, said output piston being operatively connected to said input piston for exerting a cyclic force thereon, said output piston being operatively connected to a test specimen for transmitting a force thereon, an accumulator communicating directly with said chamber for maintaining a predetermined range of maximum and minimum pressure in said hydraulic chamber, said drive means includes a cam driven means for exerting said cyclic force on said input piston, said accumulator consisting of a balance piston and a pneumatic chamber, and said balance piston having one end communicating directly with said hydraulic chamber and the other end communicating directly with said pneumatic chamber for maintaining a predetermined maximum and minimum pressure on said hydraulic chamber.

2. A test machine as set forth in claim 1 wherein said pneumatic chamber comprises a large volume relative to said hydraulic chamber.

3. A testing machine as set forth in claim 2 wherein the effective area of said input piston is equal to the sum total of the effective area of said balance piston and said output piston.

4. A testing machine as set forth in claim 1 wherein the volume displacement of said output and balance pistons equals the volume displacement of said input pistons.

5. A testing machine as set forth in claim 4 wherein pressure indicator means are connected to said pneumatic chamber to register the loading of said input piston.

6. A testing machine as set forth in claim 3 wherein said test machine has a strain gauge, said output piston is operatively connected to said strain gauge which measures the differential stress on said specimen and indicating means operatively connected to said strain gauge for measuring the form and amplitude exerted upon said strain gauge.

7. A constant stress cycling machine for testing tread material comprising a housing having a recessed portion, a pair of spaced pistons cooperative with said recessed portion to define a closed liquid chamber therebetween, cam driven means operatively connected to one of said pistons for effecting pressure fluctuations in said chamber against the other of said pistons, said other piston being connected to a test specimen for transmitting cyclic loading thereto, and an energy storing means operatively connected to said chamber for maintaining preset limits of pressure in said chamber thereby transmitting a predetermined cyclic force to said other piston.

References Cited

UNITED STATES PATENTS 1,066,447  7/1913  Cleveland _____ 73—97

FOREIGN PATENTS 606,046  11/1934  Germany.
652,698  10/1937  Germany.
950,016  2/1964  Great Britain.

RICHARD C. QUEISSER, *Primary Examiner.*

JERRY W. MYRACLE, *Assistant Examiner.*